Jan. 20. 1925. 1,523,410
T. ELLIOTT
WINDOW MECHANISM FOR VEHICLE BODIES
Filed June 20, 1921 5 Sheets-Sheet 5
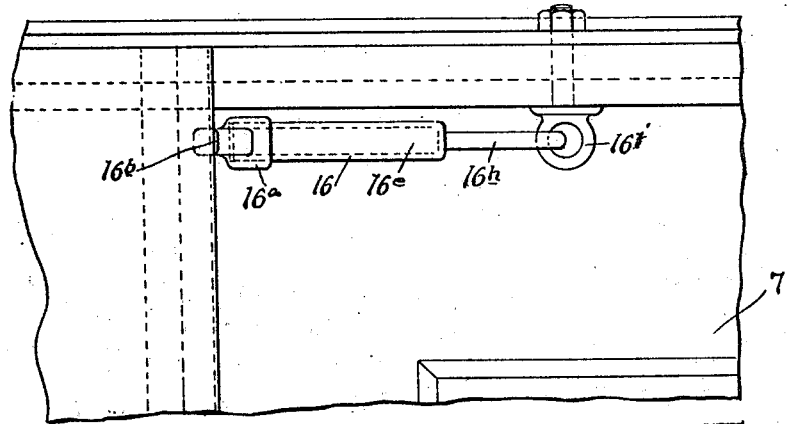
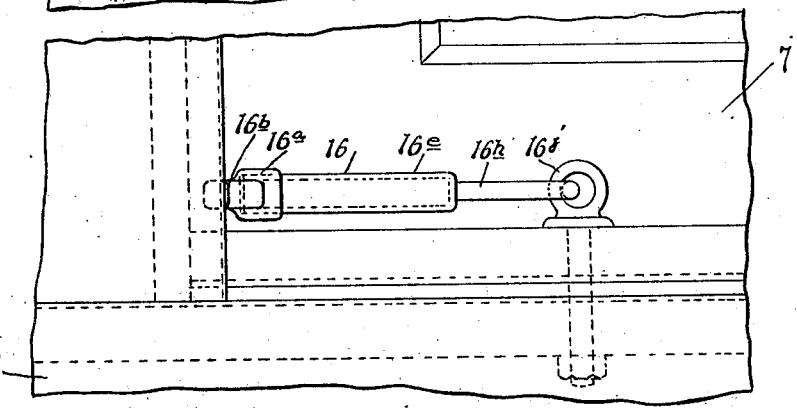
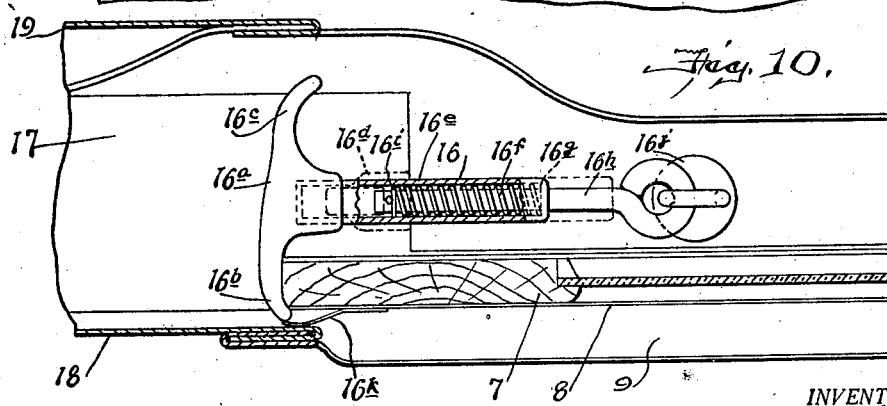
INVENTOR.
Thomas Elliott,
BY
ATTORNEYS.

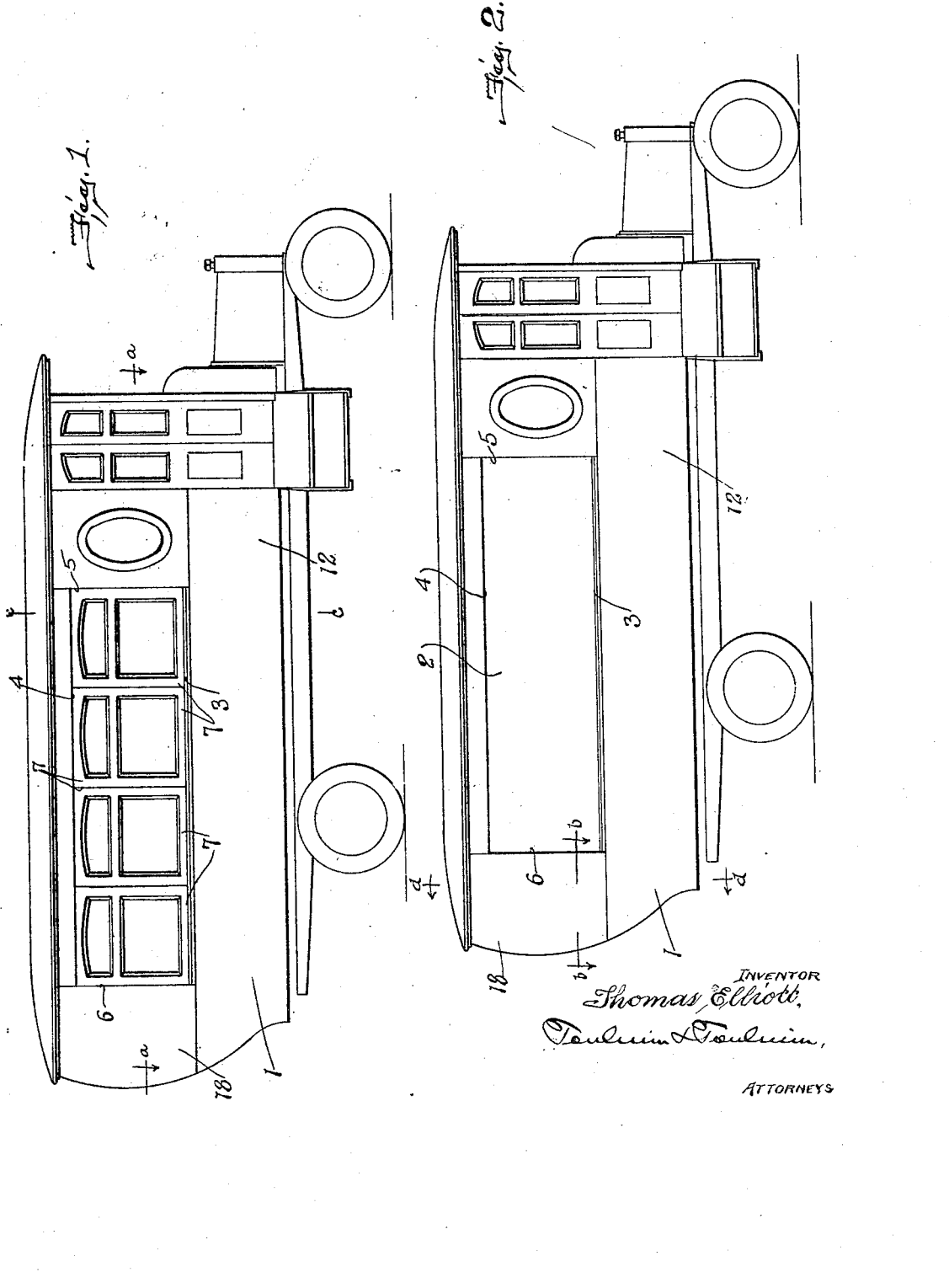

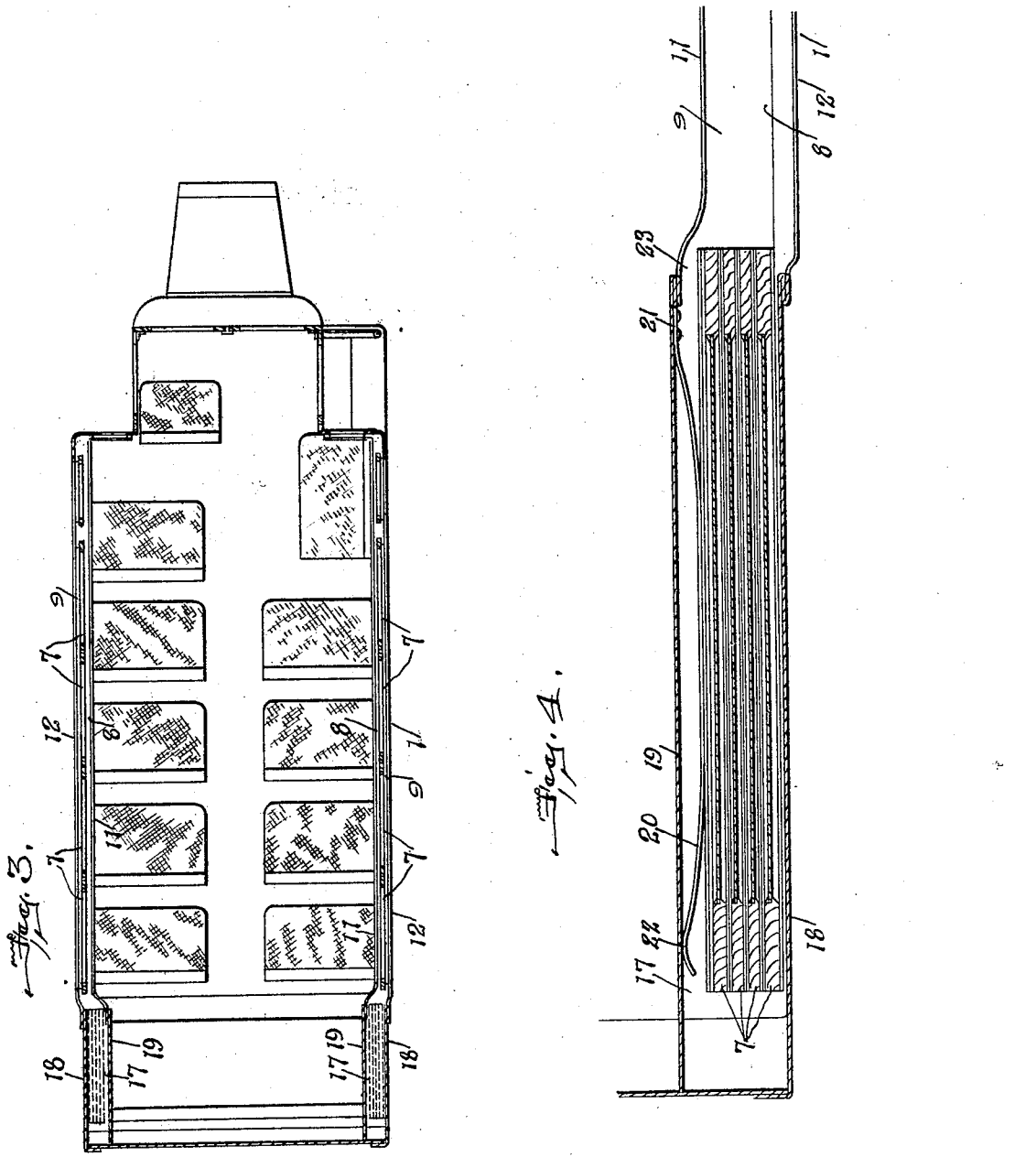

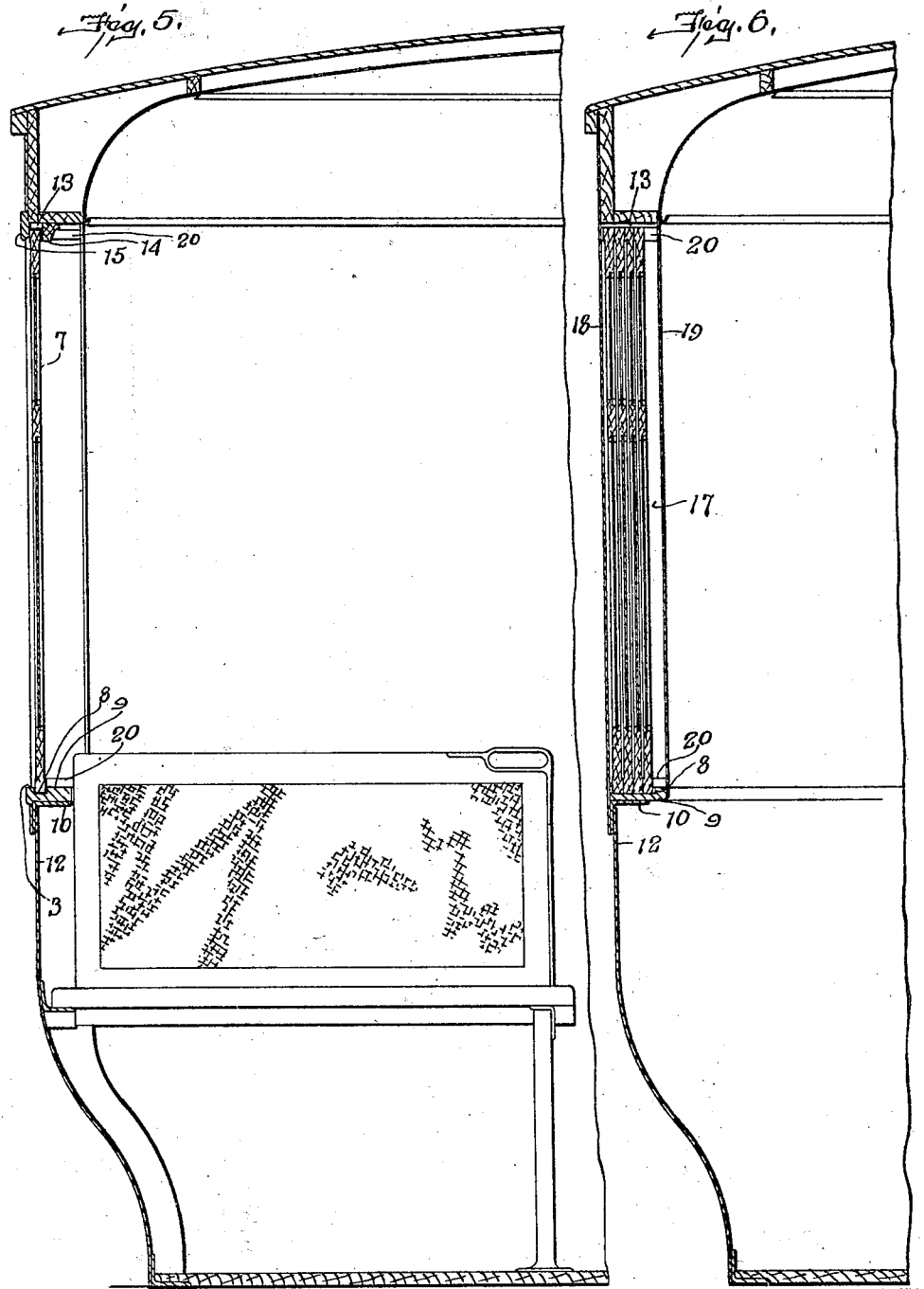

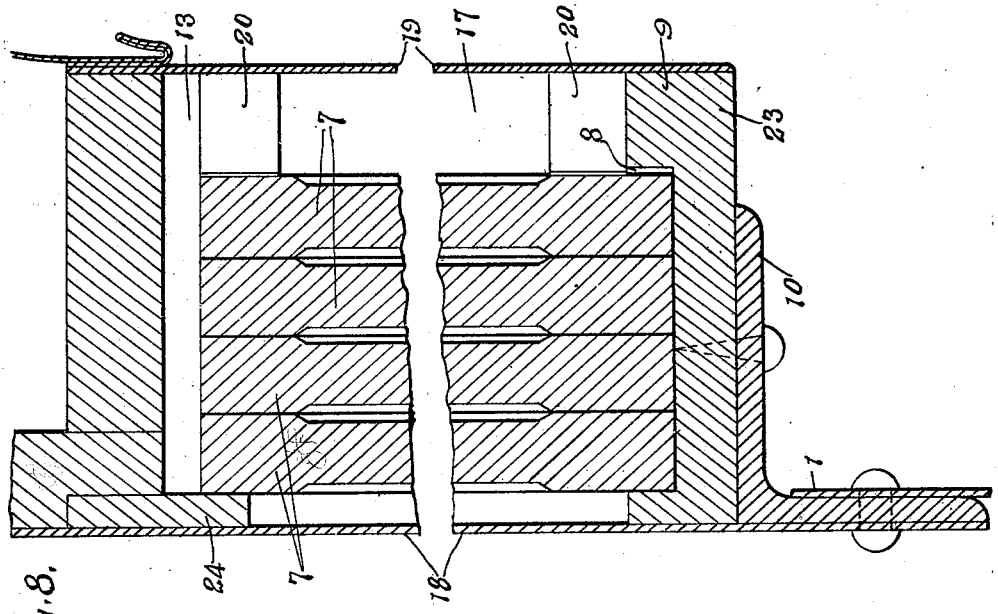
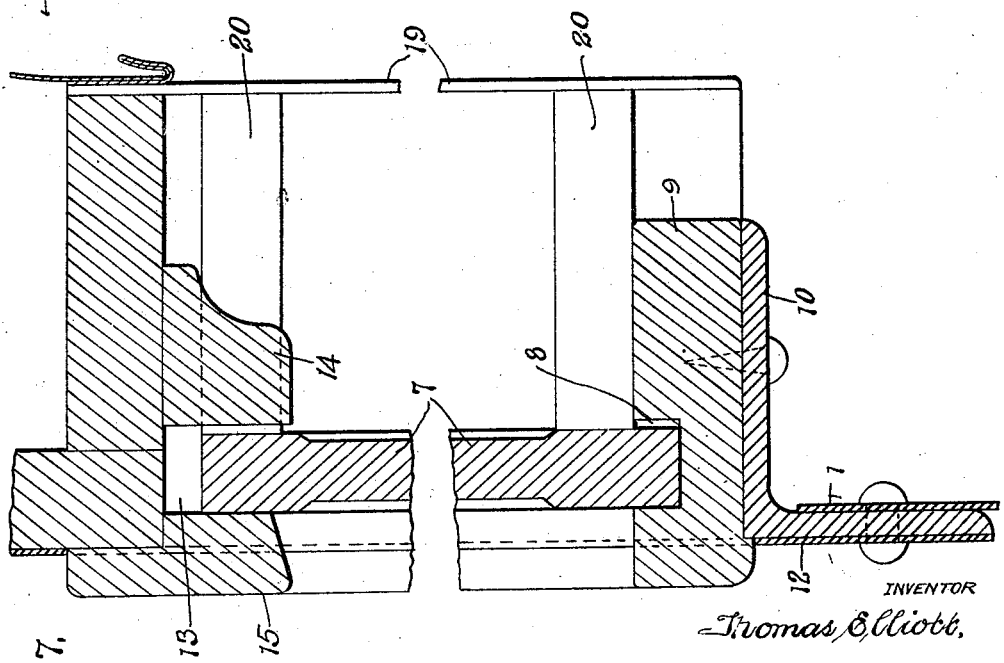

Patented Jan. 20, 1925.

1,523,410

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

WINDOW MECHANISM FOR VEHICLE BODIES.

Application filed June 20, 1921. Serial No. 478,880.

*To all whom it may concern:*

Be it known that I, THOMAS ELLIOTT, a citizen of the United States, residing at Cincinnati, in the county of Hamilton and State of Ohio, have invented certain new and useful Improvements in Window Mechanism for Vehicle Bodies, of which the following is a specification, reference being had therein to the accompanying drawings.

This invention relates to vehicle bodies, particularly bodies for motor busses and electrical railway cars, more especially the former.

The general object which I have in view, and which this invention accomplishes, is the provision in such a vehicle body of an open unobstructed space at each side, without the usual side posts, so that when the sashes are withdrawn the body will be converted from a sash enclosed winter body to an open summer body; and also the provision at one end of the car of a pocket or enclosed space for the reception of all the sashes when they are to be removed from their places along the sides of the body.

These general objects, and others of an incidental nature are fully carried out by the form of my invention exemplified in the accompanying drawings.

In these drawings;

Fig. 1 is a side elevation of my improved body shown in the form of a body adapted for a motor bus, showing the sash in closed position;

Fig. 2 is a like view showing the body with the sashes removed from closed position to leave the body open at the sides;

Fig. 3 is a horizontal sectional view on the line *a—a* of Fig. 1, illustrating the parts in diagrammatical form;

Fig. 4 is an enlarged sectional view on the line *b—b* of Fig. 2 showing the pocket and the sashes therein;

Fig. 5 is an enlarged vertical sectional view of one side of the body, taken on the line *c—c* of Fig. 1;

Fig. 6 is a similar view taken on the line *d—d* of Fig. 2;

Fig. 7 is an enlarged sectional detail view also taken on the line *c—c* of Fig. 1 and showing the construction of the body in that part occupied by the sashes when in closed position;

Fig. 8 is a similar enlarged sectional show also taken on the line *d—d* of Fig. 2 showing the sash pocket and the sashes therein and the construction of this part of the body;

Fig. 9 is an enlarged detail side elevation showing parts of two adjacent sashes; and Fig. 10 is a horizontal sectional view on the line *e—e* of Fig. 9.

In Figs. 1 and 2 I have shown, for the purposes of illustration, my improved vehicle body in a form adapted for use in a motor bus. But it will be understood that so far as concerns the general arrangement and type of the body it may be such as is applicable for use in street and interurban railway cars.

Therefore, it will be understood that the body designated generally by the numeral 1 may be of any of the usual or approved types of construction, changed in the particulars now noted, namely, by the absence of side posts which occupy vertical positions along the sides of the body and divide off the space into a succession of window openings. These posts are eliminated under the terms of my invention. Instead the space indicated at 2 is continuous or undivided from the sill 3 to the crown 4 and from the forward end 5 to the rear end 6. This space is occupied by the sashes 7, as shown in Figs. 1, 3 and 5.

The sashes are fitted in a longitudinal way 8 at the bottom formed in a sash rest 9 secured to a belt rail 10 to which the body panels 11 and 12 are secured. This sash rest runs longitudinally of the car and supports all the sashes. At the top of the general opening 2 another way 13 is formed between an inner molding 14 and an outer molding 15. In this way the sashes are all properly held when in what I term closed position, such as shown in Fig. 1. They are edge to edge and are urged against each other forcibly, to make a tight joint between them, by a suitable sash-retaining spring device designated at 16 in Figs. 9 and 10. This keeps the sashes from rattling and also excludes dust and cold.

When the sashes are to be opened and the body converted into an open body the spring device 16 is thrown out of position, as shown by the dotted lines, and the sash rendered free to be slid into a pocket or enclosed space 17 located at one end of the sash ways, preferably at the rear end between the body panel 18 and an inner lining or sheathing 19. This pocket is best seen in Figs. 4, 6 and 8.

Referring more in detail to the sash-retaining spring device 16, and in this connection to Figs. 9 and 10, it will be seen that one of these devices is located near the upper part and another near the lower part of the sash nearest the pocket so as to urge that sash against the next and the next against the adjoining and so on through the series of sashes. To this end the device comprises a head $16^a$ having a projection $16^b$ which engages the sash and a handle $16^c$ adapted to be manipulated by the hand of the conductor or bus-man so as to adjust the head to bear on the sash or to stand practically in the vertical, as indicated by the dotted position $16^d$ to permit the sash to be slid back into the pocket. The head carries a sleeve $16^e$ in which is placed an extension spring $16^f$ abutting at one end against the sleeve at $16^f$ and at the other acting against a rod $16^h$ having a washer and pin $16^i$ to afford a shoulder for the spring. This rod connects with an eye-bolt $16^j$, as seen more clearly in Fig. 9, the eye-bolt being secured in a suitable part of the car structure.

It will now be seen and understood that when the sashes are closed and this sash-retaining spring device is placed in position shown in Fig. 10 to act upon the adjacent sash, it will operate to hold all the sashes firmly together, edge to edge, to exclude dust and air. It will also be understood that when the sashes are to be slid back into the pocket, a simple turning of the head $16^a$ out of engagement with the adjacent sash will permit this to be done.

As this sash-retainer is by preference applied both near the upper and lower parts of the sash the several sashes are thereby the more intimately and properly held in dust and rain excluding contact.

By preference the sash adjacent the retaining spring device is provided with a small guiding spring plate $16^k$, one near each spring device, to aid in holding this sash against any in and out vibrations.

It will be observed that the pocket 17 accommodates all of the sashes abreast. As the sashes are slid into the pocket one by one, each takes its place until they all stand side by side. To hold them in the pocket or prevent their moving out by the jars incident to the movement of the vehicle, as also to prevent them from rattling and producing noise, a suitable spring device is employed, such as shown at 20, one such spring being located at or near the bottom of the sash and another at or near the top, as seen best in Figs. 4, 6 and 8. This spring is in the form of a long strip secured at one end, as at 21, and adapted at the other, as at 22, to press against the sheathing 19, so that its middle portion will spring. When the first sash is pushed into the pocket the springs yield slightly to it. When the next sash enters the springs yield to it and so on until all the sashes have been placed in the pocket, when the springs will be found to be pressing against the last sash and to be holding all the sashes in intimate contact under pressure.

The sash rest 9 is widened out, as shown at 23 in Fig. 8, where the pocket commences, so as to accommodate all of the sashes side by side. And likewise the sash guide at the top is widened out where the pocket commences. This is done by the omission of the inner molding 14 within the pocket, so that the upper portions of the sashes are between the upper spring 20 and a frame member 24.

Among other features of body construction shown in the drawings, such as the roof structure, the seat arrangement, the doorway and doors are features that are common to body construction and may be of the forms shown or otherwise. But as they form no part of this invention they are not specifically described or designated.

It will now be seen that an embodiment of my invention comprises a vehicle body in which when the sashes are removed from closed position there is an unobstructed large opening at the side for freedom of air and light, so that a warm weather or summer body is at once provided, no posts or uprights marring or interfering with this extended open side.

It will also be observed that under my invention there is provided this pocket or space into which all the sashes may be adjusted or placed for their care and accommodation while the car is being used as a summer vehicle, and yet that the sashes are instantly available for being easily replaced in closed position, so that in case of the occurrence of a rain storm, or on the return of cold weather, they may be easily and quickly adjusted into closed position.

Having thus fully described my invention, what I claim as new and desire to secure by Letters Patent, is:—

1. A vehicle body having in its side wall an unobstructed open space provided with sash ways near its upper and lower margins, and a sash pocket contiguous with said space and itself having sash ways near its upper and lower margins, the ways in the space being adapted to retain the sashes edge to edge and the ways in the pocket to retain the sashes side by side, and a spring latch detachably engaging the vertical side of one of the sashes and arranged to hold the sashes in contact edge to edge and other spring devices to hold the sashes in contact side by side.

2. A vehicle body having an extended unobstructed opening in its side and having a sash pocket near one end contiguous with said opening, said opening adapted to accommodate all of the sashes when edge to edge and said pocket to accommodate all of them when side by side, a sash rest at the bottom of said opening and said pocket, the rest being of width in the opening to accommodate the sashes edge to edge and of width in the pocket to accommodate the sashes side by side, springs adapted to act on the sashes when in the pocket to keep them in side contact, and spring latches releasably engageable with the vertical side edge of an end sash and adapted to act on the sashes when in the opening to keep them in edge contact.

3. A vehicle body having an unobstructed open space extending throughout the major portion of its side, a pocket adjacent such space, a plurality of sashes adapted alternately to occupy said space to close it and said pocket to open said space, and spring latches releasably engaging the vertical side edge of an end sash and acting on the sashes to forcibly move the sash along into edge contact into closed position.

4. A vehicle body having an extended open space in the side thereof, a pocket adjacent such space, a plurality of sashes adapted alternately to occupy said space and to close said pocket to open said space, and a sash-retaining spring hook adapted to exert pressure on the vertical side edge of one of the sashes to urge and hold all of the sashes in edge to edge contact.

In testimony whereof, I affix my signature.

THOMAS ELLIOTT.